United States Patent
England

(10) Patent No.: US 8,420,038 B2
(45) Date of Patent: Apr. 16, 2013

(54) METHOD FOR REMOVING CONTAMINANTS FROM A FLUID STREAM

(75) Inventor: William G. England, Suwanee, GA (US)

(73) Assignee: Purafil, Inc., Doraville, GA (US)

( * ) Notice: Subject to any disclaimer, the term of this patent is extended or adjusted under 35 U.S.C. 154(b) by 0 days.

(21) Appl. No.: 13/588,047

(22) Filed: Aug. 17, 2012

(65) Prior Publication Data

US 2012/0305499 A1  Dec. 6, 2012

Related U.S. Application Data

(62) Division of application No. 12/726,746, filed on Mar. 18, 2010, now Pat. No. 8,247,346.

(51) Int. Cl.
| | |
|---|---|
| *B01D 53/38* | (2006.01) |
| *B01D 53/52* | (2006.01) |
| *B01D 53/58* | (2006.01) |
| *B01D 53/72* | (2006.01) |
| *B01J 20/04* | (2006.01) |
| *B01J 20/10* | (2006.01) |
| *B01J 20/22* | (2006.01) |

(52) U.S. Cl.
USPC ........... 423/228; 423/210; 423/220; 423/230; 423/237; 423/245.1; 502/400; 502/401; 502/407; 502/411; 502/413; 502/415; 502/417

(58) Field of Classification Search .................. 502/400, 502/401, 404, 405, 407, 411, 413–417; 423/210, 423/220, 226, 228, 230, 237, 245.1
See application file for complete search history.

(56) References Cited

FOREIGN PATENT DOCUMENTS

WO   WO 2010/027929   * 3/2010

* cited by examiner

*Primary Examiner* — Daniel C McCracken
*Assistant Examiner* — Daniel Berns
(74) *Attorney, Agent, or Firm* — Kilpatrick Townsend & Stockton LLP

(57) ABSTRACT

A method for removing at least one contaminant from a fluid stream includes filtering the fluid stream with a filtration medium. The filtration medium includes an impregnate. The impregnate includes an organic amine and an inorganic metal salt. The inorganic metal salt includes magnesium oxide, calcium oxide or combinations thereof. The medium has from about 0.1 to about 25% by weight of impregnate. The impregnate contains from about 0.1 to about 5% by weight organic amine, and the organic amine includes aqueous urea, solid urea, melamine or mixtures thereof. The impregnate contains from about 0.1 to about 5% by weight metal salt. The impregnate optionally further includes a surfactant such as polyacrylic acid. In some embodiments, the method includes removing at least two contaminants from the fluid stream.

21 Claims, No Drawings

METHOD FOR REMOVING CONTAMINANTS FROM A FLUID STREAM

RELATED APPLICATIONS

This application is a division of U.S. patent application Ser. No. 12/726,746 filed Mar. 18, 2010, which issued as U.S. Pat. No. 8,247,346 on Aug. 21, 2012, and which claims the benefit of U.S. Provisional Patent Application No. 61/161,202, filed Mar. 18, 2009, the entire disclosures of each of which are incorporated by reference herein in their entirety.

TECHNICAL FIELD

The present invention relates generally to compositions and methods for the removal of compounds having disagreeable odors, toxic properties or corrosive properties from gaseous streams and more particularly relates to the use of air filtration media in filter beds.

BACKGROUND OF THE INVENTION

The removal of toxic, corrosive and odorous gases can be accomplished by a number of techniques. These may include wet scrubbing, incineration, and removal via gas-phase air filtration using a variety of dry scrubbing adsorptive, absorptive, and/or chemically impregnated media. As opposed to these other methods, gas-phase air filtration does not require the consumption of large quantities water or fuel. Dry-scrubbing media can be engineered from a number of common adsorbent materials with or without chemical additives for the control of a broad spectrum of gases or tailored for specific gases.

In contrast to the reversible process of physical adsorption, chemical adsorption, also referred to as chemisorption, is the result of chemical reactions on the surface of the media. This process is specific and depends on the physical and chemical nature of both the media and the gases to be removed. Some oxidation reactions can occur spontaneously on the surface of the adsorbent, however, a chemical impregnate is usually added to the media. The impregnate imparts a higher contaminant removal capacity and can lend some degree of specificity. Although some selectivity is apparent in physical adsorption, it can usually be traced to purely physical, rather than chemical, properties. In chemisorption, stronger molecular forces are involved, and the process is generally instantaneous and irreversible.

Undesirable airborne compounds such as hydrogen sulfide, ammonia and formaldehyde occur in a number of environments, where most are primarily responsible for the presence of disagreeable odors or irritating or toxic gases. Such environments include municipal waste treatment facilities, paper mills, petrochemical refining plants, morgues, hospitals, anatomy laboratories, hotel facilities, museums, archives, computer and data storage rooms, and other commercial and industrial facilities.

These undesirable compounds may be bacterial breakdown products of higher organic compounds, or simply byproducts of industrial processes.

Hydrogen sulfide ("$H_2S$"), a colorless, toxic gas with a characteristic odor of rotten eggs, is produced in coal pits, gas wells, sulfur springs and from decaying organic matter containing sulfur. Controlling emissions of this gas, particularly from municipal sewage treatment plants, has long been considered desirable. More recently, protecting electronic apparatus from the corrosive fumes of these compounds has become increasingly important. Furthermore, $H_2S$ is flammable.

Ammonia ("$NH_3$") is also a colorless gas. It possesses a distinctive, pungent odor and is a corrosive, alkaline gas. The gas is produced in animal rooms and nurseries, and its control also has long been considered important.

Formaldehyde ("$OCH_2$") is a colorless gas with a pungent, suffocating odor. It is present in morgues and anatomy laboratories, and because it is intensely irritating to mucous membranes, its control is necessary.

Attempts have been made to provide solid filtration media for removing the undesirable compounds described above from fluid, or moving, streams, such as gas or vapor streams. Although a variety of impregnated substrates are known for removing undesirable contaminants from fluid streams, these known impregnated substrates are highly selective, that is, each impregnate can treat only a specific type of compound. In applications where several undesirable compounds are present, the air filtration media would either need to have several impregnates included therein or several different air filtration media would need to be used. This results in the currently available media not meeting the needs of various industries.

The residential air quality industry has incorporated an absorbent composition containing two or more absorbent compounds into carpet and window blinds. This absorbent composition attempts to absorb numerous undesirable gaseous compounds that are present in household air, including formaldehyde (from plywood and furniture), organic solvents (from paint, adhesives and wallpaper), gases from insecticides, germicides, agricultural chemicals, and odors from cigarette smoke and pets. This absorbent composition has not, however, been applied to industrial, commercial or residential air filtration media.

Therefore, what is needed is an air filtration media having impregnated thereon a composition capable of absorbing multiple categories of undesirable gases, including hydrogen sulfide, formaldehyde and ammonia.

SUMMARY OF THE INVENTION

A solid air filtration medium includes an impregnate, wherein the impregnate contains an organic amine and an inorganic metal salt. The medium contains from about 0.1 to about 25% by weight of impregnate.

The impregnate contains from about 0.1 to about 5% by weight organic amine, which is preferably aqueous urea, solid urea, melamine or mixtures thereof.

The impregnate contains from about 0.1 to about 5% by weight metal salt, which is preferably magnesium oxide, calcium oxide or mixtures thereof.

The impregnate optionally further includes from about 0.1 to about 10% by weight surfactant, which is preferably polyacrylic acid.

Methods for forming a solid air filtration medium include applying an impregnate to a porous substrate, wherein the impregnate includes an organic amine and an inorganic metal salt. The porous substrate is preferably activated alumina, silica gel, zeolite, kaolin, adsorbent clay, activated bauxite, activated carbon or combinations thereof.

Methods for removing at least two contaminants from a fluid stream include filtering the fluid stream with an air filtration medium comprising an organic amine and an inorganic metal salt.

DETAILED DESCRIPTION OF THE INVENTION

Dry scrubbing air filtration media and methods of treating a fluid stream with the media are provided. The solid filtration media can be used to remove or reduce undesirable compounds, or contaminants, from a gaseous fluid stream. The solid filtration media contain an organic amine and an inorganic metal salt. The organic amine and inorganic metal salt are preferably, but do not have to be, applied to the air filtration media as a liquid impregnate solution. An optional surfactant is added to the liquid impregnate solution to maintain the metal salt suspended in the solution.

Generally described, the filtration media contain a substrate impregnated with a solution containing an organic amine and an inorganic metal salt. The filtration media include approximately 0.1 to about 25% by weight of the solution.

The organic amine is preferably selected from aqueous urea, solid urea, melamine and mixtures thereof. The solution preferably contains from about 0.1 to about 5% by weight organic amine.

The metal salt is preferably selected from metal oxides such as, but not limited to, magnesium oxide and calcium oxides. The liquid preferably contains from about 0.1 to about 5% by weight metal salt.

When applied to the filtration media, the organic amine and metal salt allow the media to remove or reduce undesirable compounds, or contaminants, from a gaseous fluid stream. In particular, the filtration media can remove a combination of undesirable compounds, such as hydrogen sulfide, formaldehyde and ammonia. Previously known air filtration media have been unable to effectively simultaneously filter this wide range of compounds.

The organic amine component of the filtration media reacts with formaldehyde according to formula (I):

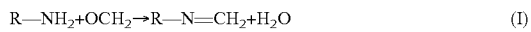

$$R\text{---}NH_2 + OCH_2 \rightarrow R\text{---}N=CH_2 + H_2O \quad (I)$$

The gaseous formaldehyde is thus converted to a solid organic nitrogen compound.

The metal salt also neutralizes the formaldehyde by catalyzing the breakdown of formaldehyde into water and carbon dioxide. The metal salt is not consumed in the catalytic reaction and is available to treat additional undesirable compounds.

Undesirable compounds and contaminants such as ammonia and hydrogen sulfide are neutralized by a catalytic reaction with the metal salt to form water and a nitrogen oxide or sulfur oxide, respectively. As with the catalytic reaction of the metal salt with formaldehyde, the metal salt is not consumed in the ammonia and hydrogen sulfide neutralization reactions.

The porous substrate to which the impregnate solution is applied may be selected from the group consisting of, but not limited to, activated alumina ($Al_2O_3$) (UOP Chemical, Baton Rouge, La.), silica gels (J. M. Huber, Chemical Division, Havre De Grace, Md.), zeolites (Steel Head Specialty Minerals, Spokane, Wash.), kaolin (Englehard Corp., Edison, N.J.), adsorbent clays (Englehard Corp., Edison, N.J.), activated bauxite, activated carbon such as activated carbon cloth, woven or nonwoven particulate filters or combinations thereof. Preferably, the concentration of impregnate in the filtration media is about 0.1 to about 25% by weight.

Preferred porous substrates include alumina, activated carbon, and combinations thereof.

Another preferred porous substrate is a combination of alumina and a zeolite. Though not intending to be bound by this statement, it is believed that zeolites further control the moisture content of the filtration media by attracting and holding water, which functions to keep more of the impregnate in solution. This effect, in turn, is believed to improve the capacity and efficiency of the filtration media. As used herein, the term zeolite includes natural silicate zeolites, synthetic materials and phosphate minerals that have a zeolite-like structure. Examples of zeolites that can be used in this media include, but are not limited to, amicite (hydrated potassium sodium aluminum silicate), analcime (hydrated sodium aluminum silicate), pollucite (hydrated cesium sodium aluminum silicate), boggsite (hydrated calcium sodium aluminum silicate), chabazite (hydrated calcium aluminum silicate), edingtonite (hydrated barium calcium aluminum silicate), faujasite (hydrated sodium calcium magnesium aluminum silicate), ferrierite (hydrated sodium potassium magnesium calcium aluminum silicate), gobbinsite (hydrated sodium potassium calcium aluminum silicate), harmotome (hydrated barium potassium aluminum silicate), phillipsite (hydrated potassium sodium calcium aluminum silicate), clinoptilolite (hydrated sodium potassium calcium aluminum silicate), mordenite (hydrated sodium potassium calcium aluminum silicate), mesolite (hydrated sodium calcium aluminum silicate), natrolite (hydrated sodium aluminum silicate), amicite (hydrated potassium sodium aluminum silicate), garronite (hydrated calcium aluminum silicate), perlialite (hydrated potassium sodium calcium strontium aluminum silicate), barrerite (hydrated sodium potassium calcium aluminum silicate), stilbite (hydrated sodium calcium aluminum silicate), thomsonite (hydrated sodium calcium aluminum silicate), and the like. Zeolites have many related phosphate and silicate minerals with cage-like framework structures or with similar properties as zeolites, which may also be used in place of, or along with, zeolites. These zeolite-like minerals include minerals such as kehoeite, pahasapaite, tiptopite, hsianghualite, lovdarite, viseite, partheite, prehnite, roggianite, apophyllite, gyrolite, maricopaite, okenite, tacharanite, tobermorite, and the like.

Terms such as "filtration media", "adsorbent composition," "chemisorbent composition," and "impregnated substrate" are all interchangeable, and denote a substance that is capable of reducing or eliminating the presence of unwanted contaminants in fluid streams by the contact of such a substance with the fluid stream. It is to be understood that the term "fluid" is defined as a liquid or gas capable of flowing, or moving in a particular direction, and includes gaseous, aqueous, organic containing, and inorganic containing fluids.

The porous substrate can also be a woven or nonwoven material such as glass fiber, crêpe paper, Kraft paper, wool, steel wool, silk, cellulosic fiber fabrics, synthetic fiber fabrics or combinations thereof. Preferred cellulosic fiber fabrics include cotton, linen, viscose and rayon. Preferred synthetic fiber fabrics include nylon, rayon, polyester, polyethylene, polypropylene, polyvinyl alcohol, acrylics, acetates, polyamide and carbon fiber.

As discussed above, the impregnate could be, but does not have to be, applied to the filtration media as a liquid impregnate solution. The liquid solution could be sprayed onto the filtration media or could be applied by other known methods.

Alternatively, the impregnate could be provided as a powder. The powder could be applied directly to the filtration media, or water or another liquid could be added to the powder to hydrate it prior to application of the impregnate composition onto the filtration media.

In addition, for extruded or pelletized filtration media (such as activated alumina or activated carbon-based media), the powder to could be added directly to the alumina/carbon/etc. material prior to its extrusion or pelletization. The impregnate would thus be more or less evenly distributed throughout the media, in contrast to media which has had a liquid impregnate sprayed onto its outer surfaces.

In a liquid form, or as a powder form intended to by rehydrated into a liquid prior to application to the media, the impregnate composition preferably contains a surfactant such as polyacrylic acid or other compound in an amount sufficient to keep the metal salt suspended in the liquid solution prior to application to the filtration media. The amount of surfactant can be selected according to methods known by a person of ordinary skill in the art, and is typically from about 0.1 to about 10% by weight of the liquid solution.

Specific methods of applying liquid or powder impregnate compositions onto air filtration media are known and are not important to the invention described herein.

Contaminant Removal Methods

Also provided is a method of treating a contaminated fluid stream using the dry scrubbing filtration media described herein. This method involves contacting the contaminated fluid stream with the solid filtration composition provided herein. Typically, the undesired contaminants will be removed from air, especially from air admixed with effluent gas streams resulting from municipal waste treatment facilities, paper mills, petrochemical refining plants, morgues, hospitals, anatomy laboratories, hotel facilities, museums, archives, computer and data storage rooms, and other commercial and industrial facilities. The filtration media could also be used in residential applications. A liquid or powder impregnate could be sold to a consumer for manual application to a filter by the consumer. Methods of treating gaseous or other fluid streams are well known in the art. Any method known in the art of treating fluid streams with the media described herein may be used.

Example

Air filtration media containing the impregnate solutions described herein have been shown to be much more efficient at removing gaseous contaminants such as hydrogen sulfide, ammonia and formaldehyde. As compared against a known sodium permanganate-based filtration media, for example, the filtration media described herein has shown the following improved filtration capabilities:

| Contaminant | Filtration capacity of sodium permanganate-based filtration media | Filtration capacity of organic amine/metal salt-based filtration media |
|---|---|---|
| Hydrogen sulfide | 14% | 30% |
| Ammonia | 0% | 1% |
| Formaldehyde | 2% | 4% |

The filtration capacity was determined according to the principles described in ASTM D6646-01, "Standard Test Method for Determination of the Accelerated Hydrogen Sulfide Breakthrough Capacity of Granular and Pelletized Activated Carbon." This test method is directed at filtration of hydrogen sulfide, but was adapted for ammonia and formaldehyde.

It should be understood, of course, that the foregoing relates only to certain embodiments of the present invention and that numerous modifications or alterations may be made therein without departing from the spirit and the scope of the invention. All of the publications or patents mentioned herein are hereby incorporated by reference in their entireties.

I claim:

1. A method for removing a contaminant from a fluid stream comprising filtering the fluid stream with a filtration medium, wherein the filtration medium comprises an impregnate comprising an organic amine and an inorganic metal salt, and wherein the inorganic metal salt comprises magnesium oxide, calcium oxide or combinations thereof.

2. The method of claim 1, wherein the contaminant is selected from the group consisting of hydrogen sulfide, formaldehyde, ammonia and combinations thereof.

3. The method of claim 1, wherein the method comprises removing at least two contaminants from the fluid stream.

4. The method of claim 3, wherein the at least two contaminants are selected from the group consisting of hydrogen sulfide, formaldehyde, ammonia and combinations thereof.

5. The method of claim 1, wherein the medium comprises from about 0.1 to about 25% by weight of impregnate.

6. The method of claim 1, wherein the organic amine comprises aqueous urea, solid urea, melamine or mixtures thereof.

7. The method of claim 1, wherein the impregnate comprises from about 0.1 to about 5% by weight organic amine.

8. The method of claim 1, wherein the impregnate comprises from about 0.1 to about 5% by weight metal salt.

9. The method of claim 1, wherein the impregnate further comprises a surfactant.

10. The method of claim 9, wherein the impregnate comprises from about 0.1 to about 10% by weight surfactant.

11. The method of claim 9, wherein the surfactant is polyacrylic acid.

12. The method of claim 1, wherein the filtration medium further comprises a porous substrate.

13. The method of claim 12, wherein the porous substrate is selected from the group consisting of activated alumina, silica gel, zeolite, kaolin, adsorbent clay, activated bauxite, activated carbon and combinations thereof.

14. The method of claim 13, wherein the porous substrate is activated alumina, activated carbon, or a combination thereof.

15. The method of claim 13, wherein the porous substrate is activated alumina, zeolite or a combination thereof.

16. The method of claim 12, wherein the filtration medium is formed by applying the impregnate to the porous substrate.

17. The method of claim 16, wherein the impregnate is applied to the porous substrate in the form of a liquid solution.

18. The method of claim 16, wherein the impregnate is sprayed onto the porous substrate.

19. The method of claim 16, wherein the impregnate is applied to the porous substrate in the form of a powder.

20. The method of claim 16, wherein the impregnate is incorporated into the porous substrate prior to extrusion or pelletization of the substrate.

21. The method of claim 12, wherein the porous substrate is a woven or nonwoven material selected from the group consisting of glass fiber, crêpe paper, kraft paper, wool, steel wool, silk, cellulosic fiber fabrics, synthetic fiber fabrics and combinations thereof.

* * * * *